(12) United States Patent
Pavuk et al.

(10) Patent No.: US 9,193,377 B2
(45) Date of Patent: Nov. 24, 2015

(54) POWER STEERING SYSTEM

(71) Applicant: ArvinMeritor Technology, LLC, Troy, MI (US)

(72) Inventors: Gregory Pavuk, Berkley, MI (US); Braden Bromley, Royal Oak, MI (US); Victor Duong, Sealy, TX (US); Howard Sherman, Sealy, TX (US); Michael Weaver, Sealy, TX (US)

(73) Assignee: ArvinMeritor Technology, LLC, Troy, MI (US)

( * ) Notice: Subject to any disclaimer, the term of this patent is extended or adjusted under 35 U.S.C. 154(b) by 78 days.

(21) Appl. No.: 14/016,320

(22) Filed: Sep. 3, 2013

(65) Prior Publication Data
US 2015/0060186 A1 Mar. 5, 2015

(51) Int. Cl.
*B62D 5/09* (2006.01)
*B62D 3/12* (2006.01)
*B62D 15/02* (2006.01)
*B62D 5/12* (2006.01)

(52) U.S. Cl.
CPC .. *B62D 3/12* (2013.01); *B62D 5/12* (2013.01); *B62D 15/0225* (2013.01)

(58) Field of Classification Search
CPC ............... B62D 5/09; B62D 5/12; B62D 5/22
USPC ................................................... 180/434, 417
See application file for complete search history.

(56) References Cited

U.S. PATENT DOCUMENTS

| | | | | |
|---|---|---|---|---|
| 3,572,744 A | * | 3/1971 | Smith | 280/90 |
| 3,605,933 A | * | 9/1971 | Millard | 80/428 |
| 4,408,673 A | * | 10/1983 | Leiber | 180/422 |
| 4,492,283 A | | 1/1985 | Bertin | |
| 4,742,882 A | * | 5/1988 | Shimizu et al. | 180/444 |
| 4,838,106 A | * | 6/1989 | Adams | 74/388 PS |
| 4,842,090 A | * | 6/1989 | Shimizu | 180/413 |
| 6,039,334 A | * | 3/2000 | Ozeki | 280/93.514 |
| 6,408,976 B1 | * | 6/2002 | Saito et al. | 180/428 |
| 6,612,393 B2 | * | 9/2003 | Bohner et al. | 180/405 |
| 7,121,377 B2 | * | 10/2006 | Klais et al. | 180/428 |
| 7,942,230 B2 | | 5/2011 | Kogel et al. | |
| 8,650,982 B2 | * | 2/2014 | Matsuno et al. | 74/493 |
| 2006/0272883 A1 | * | 12/2006 | Shin et al. | 180/428 |

* cited by examiner

*Primary Examiner* — Anne Marie Boehler
*Assistant Examiner* — Michael Stabley
(74) *Attorney, Agent, or Firm* — Brooks Kushman P.C.

(57) ABSTRACT

A power steering system that may include a rack, a slider shaft, and an actuator disposed on a housing. The slider shaft may be coupled to a tie rod assembly. The rack, slider shaft, and actuator may engage an end plate. The actuator may exert force upon the end plate to assist with actuation of the rack and slider shaft.

19 Claims, 3 Drawing Sheets

POWER STEERING SYSTEM

TECHNICAL FIELD

This application relates to a power steering system, such as may be provided with a motor vehicle.

BACKGROUND

A power-assisted steering device for motor vehicles is disclosed in U.S. Pat. No. 4,492,283.

SUMMARY

In at least one embodiment, a power steering system is provided. The power steering system may include a housing, a slider shaft, a rack, a steering gear, an actuator, and an end plate. The slider shaft may be movably disposed on the housing and may be coupled to a tie rod assembly. The rack may be movably disposed on the housing and spaced apart from the slider shaft. The steering gear may engage and actuate the rack. The actuator may be disposed on the housing. The end plate may engage the rack, slider shaft, and actuator. The actuator may be configured to exert force upon the end plate to assist with actuation of the rack and slider shaft.

In at least one embodiment, a power steering system is provided. The power steering system may include a unitary housing, a slider shaft, a rack, an actuator, and an end plate. The unitary housing may include a slider shaft portion having a first hole and a rack portion having a second hole. The slider shaft may extend through the first hole and may engage first and second tie rod assemblies. The rack may extend through the second hole and may be spaced apart from the first and second tie rod assemblies. The actuator may be disposed on the housing. The end plate may engage the rack, slider shaft, actuator, and first tie rod assembly. The actuator may exert force upon the end plate to assist with actuation of the rack and slider shaft.

In at least one embodiment, a power steering system is provided. The power steering system may include a housing, a slider shaft, a rack, a steering gear, an actuator, and an end plate. The housing may include a slider shaft portion, a rack portion, and a steering gear portion. The slider shaft portion may have a first hole. The rack portion may extend from the slider shaft portion and may have a second hole that is spaced apart from the first hole. The steering gear portion may be spaced apart from the slider shaft portion and may extend from the rack portion. The slider shaft may extend through the first hole and may have first and second ends that engage first and second tie rod assemblies, respectively. The rack may extend through the second hole and may have first and second ends. The steering gear may be received in the steering gear portion and may actuate the rack. The actuator may be disposed on the slider shaft portion of the housing and may have a shaft. The end plate may engage the first end of the slider shaft, the first end of the rack, and the shaft of the actuator. The actuator may exert force to assist with movement of the slider shaft when the steering gear is actuated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
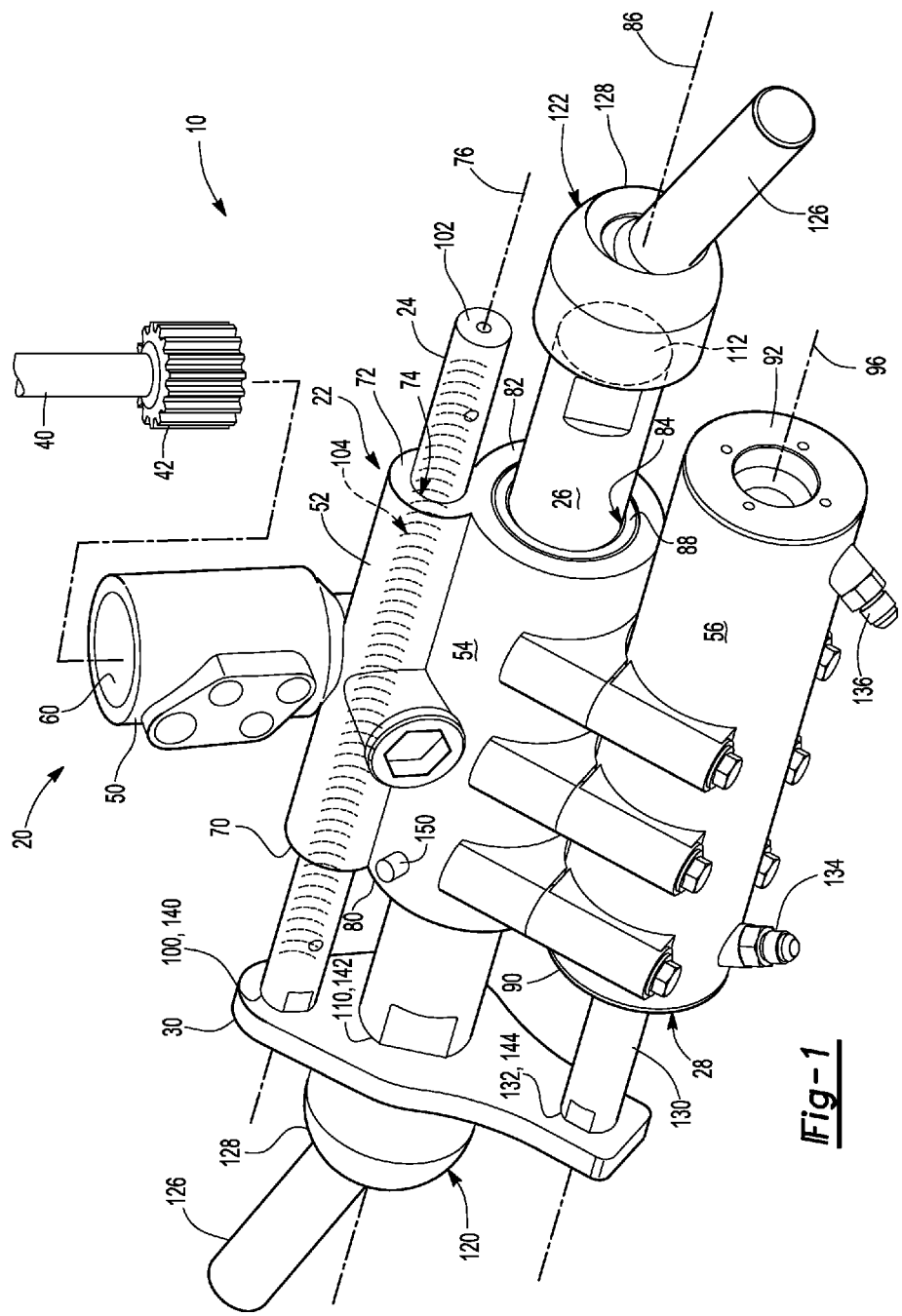
FIG. 1 is a perspective view of an exemplary power steering system.

Referring to FIG. 1, an exemplary power steering system 10 is shown. The power steering system 10 may be configured for use with a vehicle, such as a motor vehicle like a truck, bus, farm equipment, military transport or weaponry vehicle, or cargo loading equipment for land, air, or marine vessels. The power steering system 10 may be configured to change the orientation of one or more wheels to change the direction of travel of the vehicle. In at least one embodiment, the power steering system 10 may include an input portion 20, a housing 22, a rack 24, a slider shaft 26, an actuator 28, and an end plate 30.

The input portion 20 may receive a steering input or steering command. In at least one embodiment, the steering input or command may be provided by a vehicle driver. For instance, a driver may turn a hand operated steering wheel to provide a steering input. The steering wheel may be mounted on a steering shaft 40. The steering shaft 40 may couple the steering wheel to a steering gear 42. As such, rotation of the steering wheel may rotate the steering shaft 40 and the steering gear 42. The steering shaft 40 may have one or more segments that may be interconnected with a joint, such as a universal joint, thereby allowing the steering shaft 40 to deviate from a linear configuration.

The steering gear 42 may be disposed proximate an end of the steering shaft 40 that is disposed opposite the steering wheel. The steering gear 42 may have any suitable configuration, such as a pinion gear or spur gear. The steering gear 42 may help convert rotational motion of the steering shaft 40 into linear motion of the rack 24.

The housing 22 may support various components of the power steering system 10. For example, the housing 22 may support the rack 24, slider shaft 26, actuator 28, and steering gear 42 in one or more embodiments. The housing 22 may be fixedly mounted to a support surface, such as a structural member of the vehicle. As such, the housing 22 may remain stationary with respect to the vehicle chassis in one or more embodiments. The housing 22 may include one or more integrally formed features or components. For example, the housing 22 may be provided as a one-piece cast component in one or more embodiments. In at least one embodiment, the housing 22 may include a steering gear portion 50, a rack portion 52, a slider shaft portion 54, and optionally, an actuator portion 56.

The steering gear portion 50 may be configured to facilitate coupling of the input portion 20. In at least one embodiment, the steering gear portion 50 may include a steering gear cavity 60 that may be configured to receive the steering shaft 40 and the steering gear 42. The steering gear portion 50 may be disposed on and may extend away from the rack portion 52 in one or more embodiments.

The rack portion 52 may be configured to support the rack 24. The rack portion 52 may be disposed adjacent to and may be integrally formed with the steering gear portion 50. In at least one embodiment, the rack portion 52 may be generally cylindrical. For instance, the rack portion 52 may include a first end surface 70 and a second end surface 72 disposed opposite the first end surface 70. A hole 74 may extend through the rack portion 52 from the first end surface 70 to the second end surface 72. The hole 74 may be disposed along a first axis 76. The hole 74 may intersect with the steering gear cavity 60 of the steering gear portion 50 to permit teeth on the steering gear 42 to extend into the hole 74 to engage the rack 24. In addition, one or more bushings may be disposed in the hole 74 to support and facilitate movement of the rack 24.

The slider shaft portion 54 may be configured to support the slider shaft 26. The slider shaft portion 54 may be disposed adjacent to and may be integrally formed with the rack portion 52. For example, an outer wall or exterior surface of the slider shaft portion 54 may engage an exterior surface of the rack portion 52 or integrally formed spacers may be provided that join the rack portion 52 and slider shaft portion 54 in one or more embodiments. Like the rack portion 52, the slider shaft portion 54 may be generally cylindrical in one or more embodiments. For instance, the slider shaft portion 54 may include a first end surface 80 and a second end surface 82 disposed opposite the first end surface 80. The first end surface 80 may be aligned with or may be disposed generally coplanar with the first end surface 70 of the rack portion 52 in one or more embodiments. The second end surface 82 may or may not be aligned with or disposed coplanar with the second end surface 72 of the rack portion 52. A hole 84 may extend through the slider shaft portion 54 from the first end surface 80 to the second end surface 82. The hole 84 may be disposed along a second axis 86 that may be disposed substantially parallel to the first axis 76. In addition, one or more bushings 88 may be disposed in the hole 84 to support and facilitate movement of the slider shaft 26.

The actuator portion 56 may be configured to support the actuator 28 or may be part of the actuator 28. In at least one embodiment, the actuator portion 56 may be disposed adjacent to and may be integrally formed with the slider shaft portion 54. For example, an outer wall or exterior surface of the actuator portion 56 may engage an exterior surface of the slider shaft portion 54 or integrally formed spacers may be provided that join the slider shaft portion 54 and the actuator portion 56 in one or more embodiments. Alternatively, the actuator portion 56 may not be integrally formed with the housing 22, but instead may be attached to the housing 22 with one or more fasteners. The actuator portion 56 may include a first end surface 90 and a second end surface 92 disposed opposite the first end surface 90. The first end surface 90 may be aligned with or may be disposed generally coplanar with the first end surfaces 70, 80 of the rack and/or slider shaft portions 52, 54 in one or more embodiments. The second end surface 92 may not be aligned with or disposed coplanar with the second end surfaces 72, 82 of the rack and slider shaft portions 52, 54. A center bore may extend from the first end surface 90 at least partially toward the second end surface 92. The center bore may be disposed along a third axis 96 that may be disposed substantially parallel to the first and/or second axes 76, 86. The actuator portion 56 may be generally cylindrical in one or more embodiments.

The rack 24 may move linearly along the first axis 76 in response to rotation of the steering gear 42. In at least one embodiment, the rack 24 may be configured as a shaft that may be hollow and may be coaxially disposed with the first axis 76. The rack 24 may include a first end 100, a second end 102, and a set of teeth 104. The first end 100 may be disposed opposite the second end 102. The set of teeth 104 may extend along at least a portion of an exterior surface of the rack 24 between the first and second ends 100, 102. The set of teeth 104 may mesh with teeth on the steering gear 42 and may cooperate with the steering gear 42 to provide a gear reduction that makes it easier to turn the wheels. The rack 24 may be longer than the rack portion 52 of the housing 22. As such, the rack 24 may extend outwardly from each end surface 70, 72 of the rack portion 52 over its range of travel.

The slider shaft 26 may move linearly along the second axis 86. In at least one embodiment, the slider shaft 26 may be generally linear and may extend along the second axis 86. In addition, the slider shaft 26 may be hollow to reduce weight. The slider shaft 26 may have a first end 110 and a second end 112 disposed opposite the first end 110. In at least one embodiment, the first and second ends 110, 112 may be provided with a threaded hole to facilitate coupling to an associated tie rod assembly. The slider shaft 26 may be longer than the slider shaft portion 54 of the housing 22. As such, the slider shaft 26 may extend outwardly from each end surface 80, 82 of the slider shaft portion 54 over its range of travel. Optionally, a cover such as a bellows shroud may be disposed around one or more ends of the slider shaft 26 that extend outwardly from the slider shaft portion 54.

Figure 2:
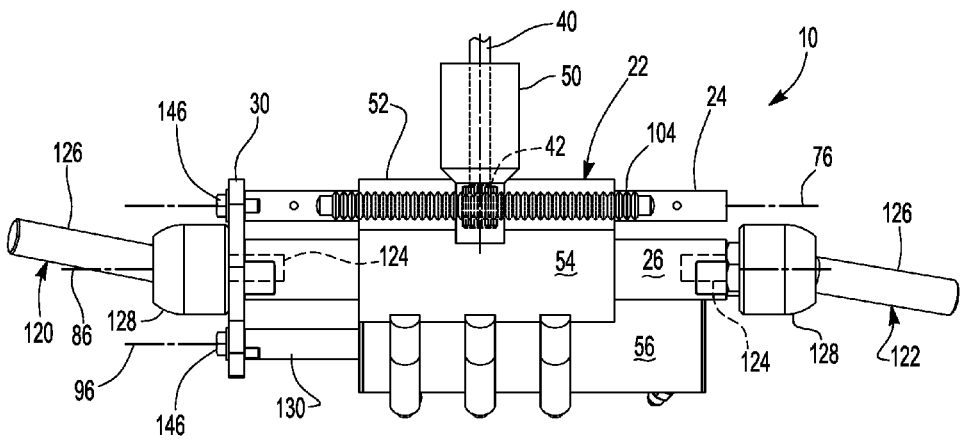
FIGS. 2-4 are perspective views of the power steering system of FIG. 1 in center, left, and right steering positions, respectively.
Figure 3:
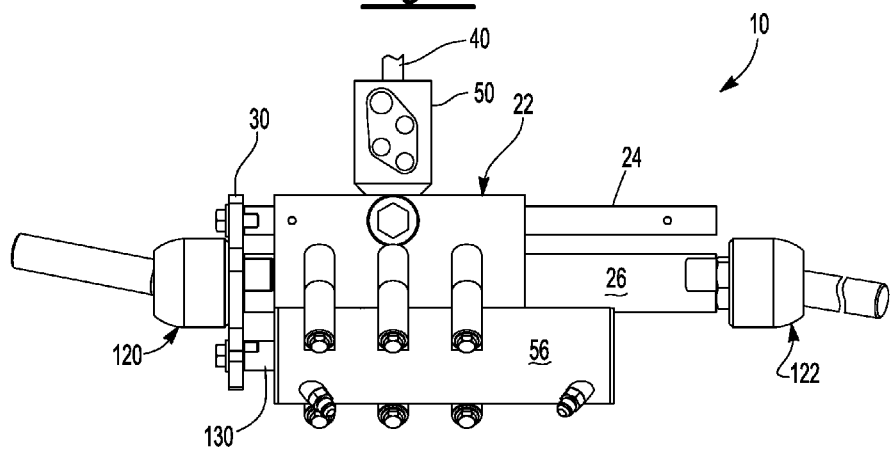
Figure 4:
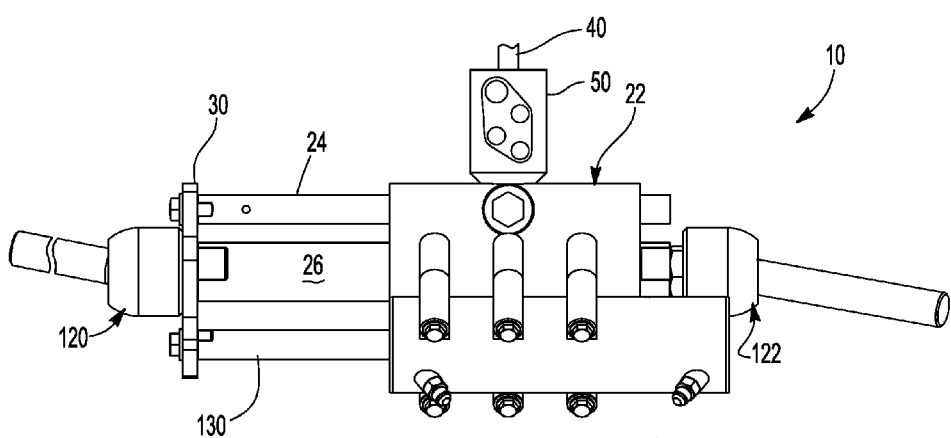

First and second tie rod assemblies 120, 122 may be provided to facilitate coupling of the slider shaft 26 to the vehicle wheels. As is best shown in FIG. 2, the first and second tie rod assemblies 120, 122 may include a first end 124, a second end 126, and a ball joint 128. The first end 124 of the first tie rod assembly 120 may engage a first end 110 of the slider shaft 26. The first end 124 of the second tie rod assembly 122 may engage a second end 112 of the slider shaft 26. In at least one embodiment, the first ends 124 may be provided with threads that mate with corresponding threads on the slider shaft 26. The second end 126 of each tie rod assembly 120, 122 may be disposed opposite the first end 124 and may be coupled to a portion of a wheel assembly, such a steering arm. The ball joint 128 may be disposed between the first and second ends 124, 126 and may accommodate movement of the wheel assembly.

The actuator 28 may exert force to reduce steering effort. The actuator 28 may have an electrical or non-electrical configuration. In an electrical configuration, the actuator 28 may be configured as an electric motor. In a non-electrical configuration, the actuator 28 may employ a high-pressure fluid, such as a hydraulic fluid, to assist with actuation of the rack 24 and slider shaft 26. In electrical or non-electrical embodiments, the actuator 28 may actuate a shaft 130 having a first end 132. The shaft 130 may be coaxially disposed with and may move along the third axis 96. In an embodiment in which the actuator 28 is a hydraulic cylinder, the shaft 130 may include or may be coupled to a piston. The piston may be disposed in a cylinder such that two fluid ports 134, 136 are disposed on either side of the piston. The cylinder may be defined by the actuator portion 56 of housing 22 or may be part of a housing that is provided with an actuator 28 that is fastened to the housing 22. High-pressure fluid provided via a port 134, 136 to one side of the piston forces the piston and shaft 130 to move, thereby providing the power assist. Pressurized fluid may be provided by a pump in a manner known by those skilled in the art.

The end plate 30 may be configured to engage the rack 24, slider shaft 26, and actuator 28. In at least one embodiment, the end plate 30 may include a first hole 140, a second hole 142, and a third hole 144. The first, second, and third holes 140, 142, 144 may be spaced apart from each other. The rack 24, slider shaft 26, and actuator 28 may be disposed proximate or may be received in the first, second, and third holes 140, 142, 144, respectively. A fastener 146, such as a bolt, may extend through the first and third holes 140, 144 to couple the rack 24 and shaft 130 of the actuator 28 to the end plate 30. Similarly, a portion of the first tie rod assembly 120 such as the first end 124, may extend through the second hole 142 to fixedly position the end plate 30 between the first tie rod assembly 120 and the slider shaft 26.

Optionally, a steering sensor 150 may be provided to detect movement of one or more components of the power steering system 10. In at least one embodiment, the steering sensor 150 may be disposed on a portion of the housing 22, such as the slider shaft portion 54, and may generate a signal in response to linear movement of the slider shaft 26.

Figure 5:
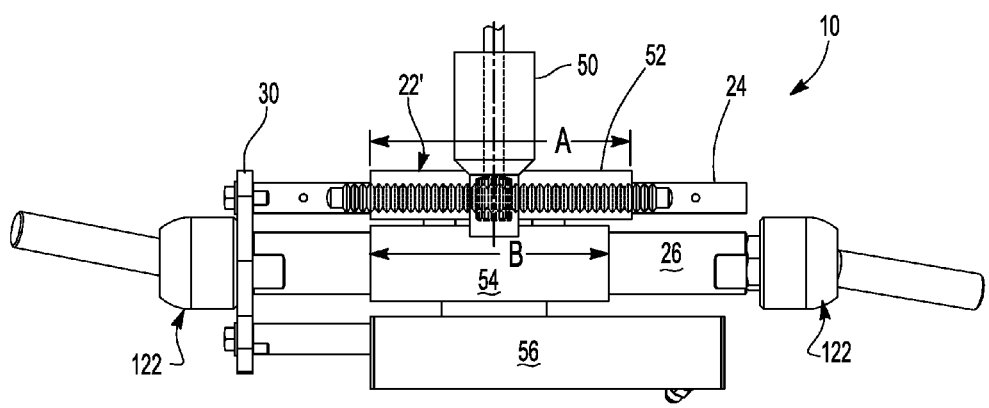
FIG. 5 is a side view of another embodiment of a power steering system.

Referring to FIG. 5, other embodiment of a power steering system 10 is shown. In this embodiment, the housing 22 is provided as a unitary component in which the rack portion 52, slider shaft portion 54, and actuator portion 56 are connected by integral spacers that extend from the exterior surfaces of these portions of the housing 22. In addition, the rack portion 52, slider shaft portion 54, and actuator portion 56 are provided with different lengths. For instance, the distance from the first end surface 70 to the second end surface 72 of the rack portion 52 in a direction extending along a first axis 76 is designated with reference letter A. The distance from the first end surface 80 to the second end surface 82 of the slider shaft portion 54 in a direction extending along the second axis 86 is designated with reference letter B. Distance B may be less than distance A to increase the length of travel of the slider shaft 26. In addition, the length of the actuator portion 56 along the third axis 96 may be greater than distances A and B.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power steering system comprising:
    a unitary housing that includes:
        an actuator portion having a cavity;
        a slider shaft portion having a first hole; and
        a rack portion having a second hole;
    a slider shaft that extends through the first hole and that engages first and second tie rod assemblies;
    a rack that extends through the second hole and is spaced apart from the first and second tie rod assemblies;
    an actuator that is disposed on the housing; and
    an end plate that engages the rack, slider shaft, actuator, and first tie rod assembly;
    wherein the actuator exerts force upon the end plate to assist with actuation of the rack and slider shaft and the cavity receives the actuator.

2. The power steering system of claim 1 wherein the rack has a set of teeth and the housing further comprises a steering gear cavity, wherein the steering gear cavity intersects the second hole.

3. The power steering system of claim 2 wherein a steering gear is disposed inside the steering gear cavity.

4. The power steering system of claim 1 wherein the first hole extends along a first axis from a first end surface of the slider shaft portion to a second end surface of the slider shaft portion, and the second hole extends along a second axis from a first end surface of the rack portion to a second end surface of the rack portion, wherein the first and second axes are disposed substantially parallel to each other.

5. The power steering system of claim 4 wherein a first distance from the first end surface of the slider shaft portion to the second end surface of the slider shaft portion is less than a second distance from the first end surface of the rack portion to the second end surface of the rack portion.

6. The power steering system of claim 4 wherein the actuator includes a first end surface that faces toward the end plate and is disposed substantially coplanar with the first end surface of the slider shaft portion.

7. The power steering system of claim 6 wherein the first end surface of the slider shaft portion is disposed substantially coplanar with the first end surface of the rack portion.

8. The power steering system of claim 1 wherein the slider shaft portion is disposed between the rack portion and the actuator portion.

9. The power steering system of claim 1 wherein the slider shaft is disposed between the rack and the actuator.

10. The power steering system of claim 1 wherein the housing includes a steering gear portion that is spaced apart from the slider shaft portion and that extends from the rack portion.

11. A power steering system comprising:
    a housing that includes:
        a slider shaft portion having a first hole;
        a rack portion that extends from the slider shaft portion, the rack portion having a second hole that is spaced apart from the first hole; and
        a steering gear portion that is spaced apart from the slider shaft portion and that extends from the rack portion;
    a slider shaft that extends through the first hole and that has first and second ends that engage first and second tie rod assemblies, respectively;
    a rack that extends through the second hole and has first and second ends;
    a steering gear that is received in the steering gear portion and that is configured to actuate the rack;
    an actuator disposed on the slider shaft portion, the actuator having a shaft; and
    an end plate that engages the first end of the slider shaft, the first end of the rack, and the shaft of the actuator;
    wherein the actuator exerts force to assist with movement of the slider shaft when the steering gear is actuated and the first tie rod assembly extends through the end plate and is fixedly disposed on the slider shaft.

12. The power steering system of claim 11 wherein the end plate is disposed between the first tie rod assembly and the slider shaft.

13. The power steering system of claim 11 wherein the housing has an actuator portion that has a cavity that receives the actuator.

14. The power steering system of claim 11 wherein the slider shaft portion, the rack portion, and the shaft of the actuator extend along first, second, and third axes, respectively, that are disposed substantially parallel to each other.

15. The power steering system of claim 11 further comprising a steering sensor disposed on the slider shaft portion of the housing for detecting a position of the slider shaft.

16. The power steering system of claim 11 wherein the rack is spaced apart from the first tie rod assembly.

17. The power steering system of claim 11 wherein the actuator is spaced apart from the rack and the slider shaft.

18. The power steering system of claim 17 wherein the slider shaft is disposed between the rack and the actuator.

19. The power steering system of claim 18 wherein the rack is disposed between the steering gear and the slider shaft.

* * * * *